United States Patent [19]

Nakamura et al.

[11] Patent Number: 5,117,936
[45] Date of Patent: Jun. 2, 1992

[54] VEHICLE PROPELLING APPARATUS

[75] Inventors: Norimi Nakamura; Minoru Fukuda; Hiroaki Kawakita, all of Sakai, Japan

[73] Assignee: Kubota Corporation, Osaka, Japan

[21] Appl. No.: 577,942

[22] Filed: Sep. 5, 1990

[30] Foreign Application Priority Data

Sep. 18, 1989 [JP] Japan .................. 1-242872

[51] Int. Cl.⁵ .................. B60K 17/10; B60K 17/356
[52] U.S. Cl. .................. 180/242; 91/473; 91/488; 180/305; 180/307
[58] Field of Search .......... 180/242, 243, 247, 305, 180/307, 308; 91/473, 488, 491, 497, 498

[56] References Cited

U.S. PATENT DOCUMENTS

| | | | |
|---|---|---|---|
| 3,808,949 | 5/1974 | Munche et al. | 91/473 |
| 3,899,958 | 8/1975 | Spencer | 91/498 |
| 3,910,162 | 10/1975 | Nonnenmacher | 91/498 |
| 4,903,792 | 2/1990 | Ze-Ying | 91/488 |
| 4,945,816 | 8/1990 | Mestieri | 91/473 |

FOREIGN PATENT DOCUMENTS

| | | |
|---|---|---|
| 56-62283 | 5/1981 | Japan . |
| 1304747 | 1/1973 | United Kingdom . |
| 2002884A | 2/1979 | United Kingdom . |
| 2083893A | 3/1982 | United Kingdom . |
| 2089007A | 6/1982 | United Kingdom . |
| 2119905A | 11/1983 | United Kingdom . |

Primary Examiner—Mitchell J. Hill
Attorney, Agent, or Firm—Jordan and Hamburg

[57] ABSTRACT

A propelling apparatus for a vehicle switchable between a four wheel drive mode and a two wheel drive mode. The apparatus comprises a hydraulic pump for driving hydraulic motors associated with front wheels and rear wheels, respectively. A shutoff valve is provided on oil lines extending between the hydraulic pump and one of the hydraulic motors, e.g. the motor associated with the front wheels. The shutoff valve is operable to establish the two wheel drive mode for driving only the rear wheels. A pumping preventive device prevents the hydraulic motor associated with the front wheels from effecting pumping action due to power transmitted from the front wheels when the shutoff valve is operated.

8 Claims, 4 Drawing Sheets

VEHICLE PROPELLING APPARATUS

BACKGROUND OF THE INVENTION

(1) Field of the Invention

The present invention relates to a propelling apparatus for a vehicle drivable by four wheels, comprising a hydraulic pump or pumps driven by an engine, and hydraulic motors operable by pressure oil supplied from the hydraulic pump or pumps to drive ground wheels.

(2) Description of the Prior Art

A propelling apparatus as constructed above is disclosed in Japanese Utility Model Publication Kokai No. 56-62283, for example. This apparatus comprises two pumps driven by an engine, a hydraulic motor for driving front wheels, and a hydraulic motor for driving rear wheels.

Some four wheel drive vehicles have a propelling system switchable between a two wheel drive mode for driving either the front wheels or the rear wheels and a four wheel drive mode for driving both the front and rear wheels. For simplicity and low cost, such a propelling system may include a single hydraulic pump for driving both the front and rear wheels.

More particularly, the propelling system comprises a single hydraulic pump, and a shutoff valve or switch valve mounted on an oil line extending to a hydraulic motor for driving the front or rear wheels. For four wheel drive, the shutoff valve is set to an open position (communicating position) to drive both the hydraulic motors. For two wheel drive, the shutoff valve is set to a closed position (shutting position) to drive only one of the hydraulic motors. In the construction in which the two wheel drive mode is established by operating the shutoff valve, the hydraulic motors remain interlocked with the ground wheels even when the shutoff valve is set to the closed position. Thus, in the two wheel drive mode, pressure oil is not supplied to one of the hydraulic motors, and this motor itself does not output power but receives torque transmitted from the ground wheels.

It means that, in the two wheel drive mode, the hydraulic motor to which pressure oil is not supplied is rotated by the torque transmitted from the ground wheels to act like a hydraulic pump for pumping the pressure oil. This not only results in an energy loss but tends to damage the hydraulic motor.

SUMMARY OF THE INVENTION

An object of the present invention is to provide an improved propelling apparatus for a four wheel drive vehicle comprising a single hydraulic pump for driving hydraulic motors connected to front and rear wheels, respectively, which, when the vehicle is driven in the two wheel drive mode, does not involve an energy loss at the hydraulic motor put out of operation and safeguards this hydraulic motor from damage.

The above object is fulfilled, according to the present invention, by a propelling apparatus for a vehicle drivable by four wheels, comprising a first hydraulic motor for driving first wheels, a second hydraulic motor for driving second wheels, a hydraulic pump for supplying oil to the first and second hydraulic motors, a first oil line for interconnecting the first hydraulic motor and the hydraulic pump, a second oil line for interconnecting the second hydraulic motor and the hydraulic pump, a shutoff valve provided on the first oil line, and a pumping preventive device for preventing the first hydraulic motor from taking a pumping action due to power transmitted from the first wheels when the shutoff valve is operated.

The pumping preventive device is effective to prevent the first hydraulic motor from acting like a pump owing to the power transmitted from the first wheels when this four wheel drive vehicle runs in a two wheel drive mode. Consequently, a propelling apparatus for a vehicle drivable by four wheels is provided which, when the vehicle is driven in the two wheel drive mode, does not involve an energy loss at the hydraulic motor put out of operation and eliminates the situation where this hydraulic motor is prone to damage.

Where the invention is applied to a vehicle which drives only the rear wheels to provide the two wheel drive mode, the first wheels comprise a pair of front wheels, and the second wheels comprise a pair of rear wheels. Conversely, where the vehicle drives only the front wheels to provide the two wheel drive mode, the first wheels comprise a pair of rear wheels, and the second wheels comprise a pair of front wheels. Though rare it may be, where the vehicle is capable of selectively driving the front wheels or rear wheels in the two wheel drive mode, naturally the pumping preventive device is provided for the second hydraulic motors as well as the first hydraulic motor. In any case, the essential feature of the present invention resides in prevention of the hydraulic motor or motors from acting as pumps which would entail various adverse consequences.

In a preferred embodiment of the present invention, the first hydraulic motor comprises a rotary cylinder radial piston type hydraulic motor including radial pistons operable by an external hydraulic control to move out of contact with inside wall of an eccentric thrust ring, thereby becoming inoperative, and the pumping preventive device comprises a hydraulic circuit for supplying pressure oil to and rendering inoperative the first hydraulic motor when the shutoff valve is operated. According to this construction, the four wheel drive mode is provided by setting the shutoff valve to an open position for supplying pressure oil from the hydraulic pump to the first hydraulic motor. When the two wheel drive mode is selected, the hydraulic circuit for preventing the pumping operates in response to setting of the shutoff valve to a closed position, thereby supplying pressure oil to the first hydraulic motor. The pressure oil then pushes the radial pistons of the first hydraulic motor into positions away from the inside walls of the eccentric thrust ring, to render the first hydraulic motor inoperative as a pump.

In another embodiment of the invention, the pumping preventive device comprises a one-way clutch provided on a transmission shaft extending between the first hydraulic motor and the first wheels. The one-way clutch is effective for power transmission only from the first hydraulic motor to the first wheels. In this case too, switching is made between the four wheel drive mode and two wheel drive mode by operating the shutoff valve. In the four wheel drive mode, power is transmitted from the first hydraulic motor to the front wheels through the one-way clutch. In the two wheel drive mode, power transmission from the front wheels to the first hydraulic motor is broken by idling of the one-way clutch, thereby preventing the first hydraulic motor from acting as a pump.

Other objects, features and advantages of the invention will be apparent from the following description.

BRIEF DESCRIPTION OF THE DRAWINGS

The drawings show vehicle propelling apparatus according to the present invention, in which.

DESCRIPTION OF THE PREFERRED EMBODIMENTS

A first embodiment of the present invention will be described hereinafter with reference to the drawings.

Figure 1:
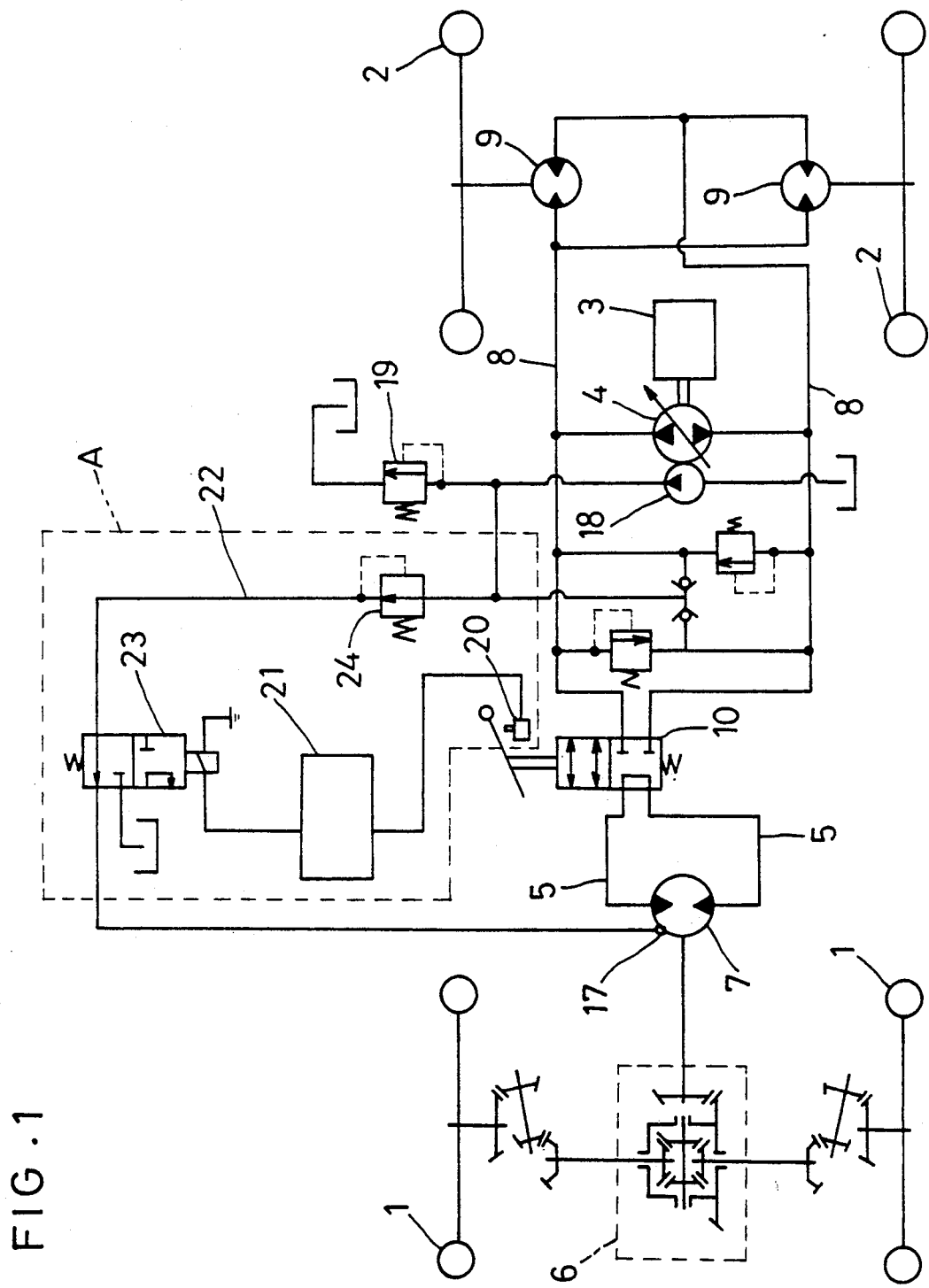
FIG. 1 shows a hydraulic circuit of a propelling apparatus in a first embodiment of the invention.

As shown in FIG. 1, a vehicle propelling system comprises steerable right and left front wheels 1, right and left rear wheels 2, an engine 3, a variable displacement hydraulic pump 4 driven by the engine 3, a first hydraulic motor 7 for receiving oil from the hydraulic pump 4 through a pair of first oil lines 5 and transmitting its output to the front wheels 1 through a differential 6, and a pair of second hydraulic motors 9 for receiving oil from the hydraulic pump 4 through a pair of second oil lines 8 and transmitting their respective outputs to the rear wheels 2.

This propelling system further comprises a shutoff valve 10 mounted on the first oil lines 5 extending to the first hydraulic motor 7. The shutoff valve 10 is switchable to open and close the first oil lines 5 for selecting between two drive modes, i.e. a four wheel drive mode for driving both the front wheels 1 and rear wheels 2 and a two wheel drive mode for driving only the rear wheels 2. Further, a pumping preventive device A is provided for preventing the first hydraulic motor 7 from pumping pressure oil as a result of torque transmission from the front wheels 1 to the first hydraulic motor 7 when the vehicle is driven in the two wheel drive mode.

Figure 2:
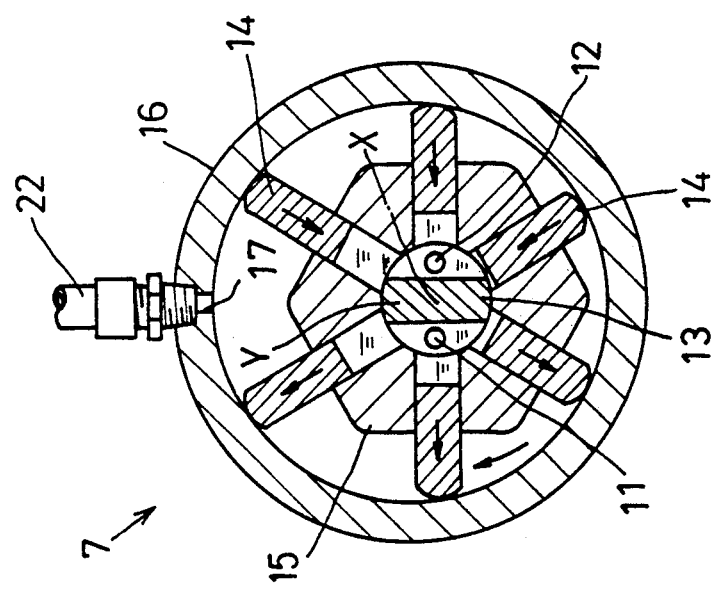
FIG. 2 is a sectional view of a radial piston motor in a driving position.

As shown in FIG. 2, the first hydraulic motor 7 comprises a rotating cylinder and radial piston construction including a rotary valve mechanism 13 having a pair of ports 11 and 12, an output rotor 15 rotatable about the valve mechanism 13 and having a plurality of radial pistons 14, and an eccentric thrust ring 16 having an axis Y displaced from a rotational axis X of the output rotor 15. When, for example, pressure oil is supplied through the lefthand port 11 and drained through the righthand port 12 in FIG. 2, the radial pistons 14 extend in sliding contact with inside walls of the eccentric thrust ring 16 and apply a torque to the output rotor 15, thereby to output the torque.

The first hydraulic motor 7 is reversed by switching the ports for supply and drainage of the pressure oil. The eccentric thrust ring 16 includes a drain port 17 for draining leak oil.

A charge pump 18 is provided for the engine 3 to replenish the hydraulic circuit. Pressure oil is supplied from the charge pump 18 under pressure control by a relief valve 19.

Figure 3:
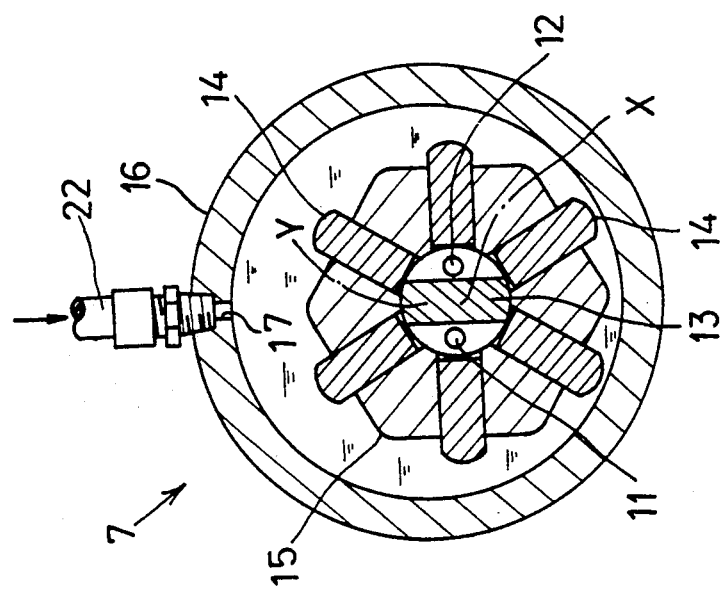
FIG. 3 is a sectional view of the radial piston motor in a position subjected to a pressure from a drain port.

The pumping preventive device A includes a switch 20 for detecting the shutoff valve 10 in the closed position, a control unit 21 which receives a signal from the switch 20, an electromagnetic valve 23 operable by a signal from the control unit 21 and provided on an oil line 22 extending between the charge pump 18 and the drain port 17 defined in the eccentric thrust ring 16 of the first hydraulic motor 7, and a reducing valve 24 for regulating the pressure in the oil line 22. When the vehicle is driven in the two wheel drive mode, the electromagnetic valve 23 is operated to the position shown in FIG. 1. Consequently, as shown in FIG. 3, the pressure from the charge pump 18 acts on the radial pistons 14 and pushes them to positions out of contact with the inside walls of the eccentric thrust ring 16.

With the radial pistons 14 pushed in as described above, the pressure oil is not pumped even though the output rotor 15 is rotated by the power transmitted from the front wheels 1. Thus, there occur no inconveniences such as an increase in the temperature of the pressure oil.

A second embodiment will be described next.

Figure 4:
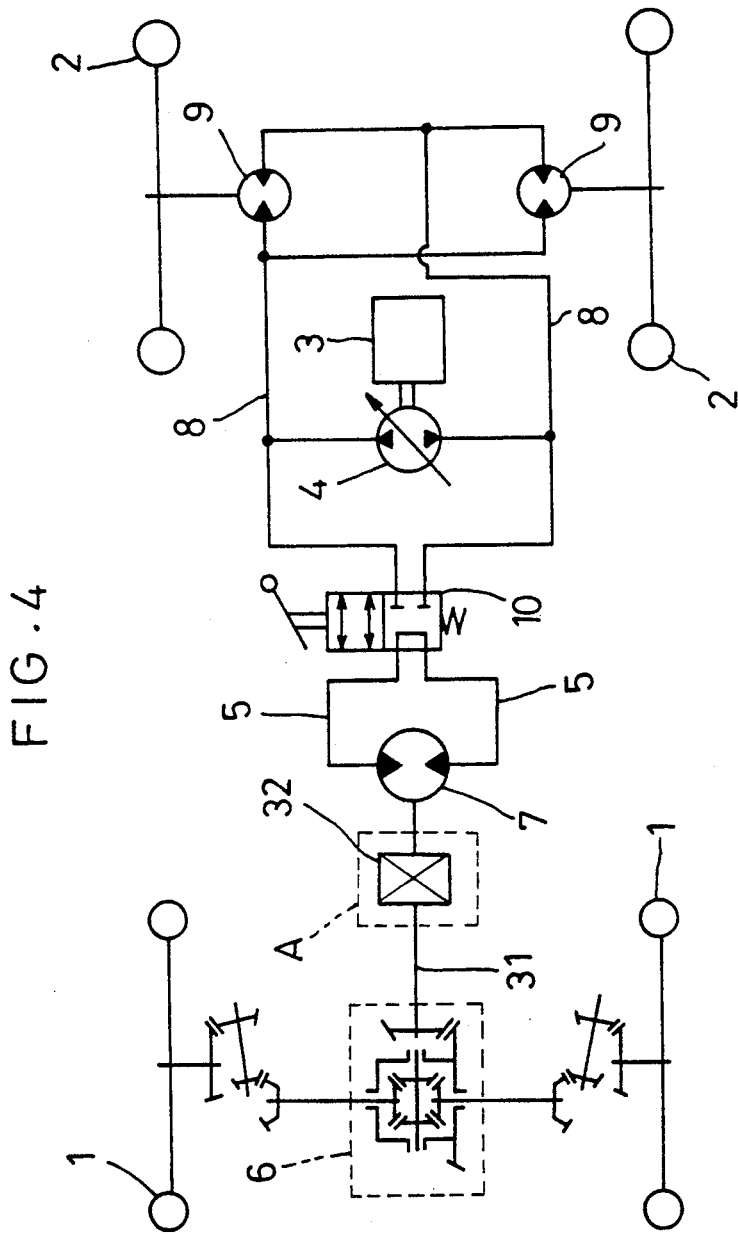
FIG. 4 shows a hydraulic circuit of a propelling apparatus in a second embodiment of the invention.

FIG. 4 shows a vehicle propelling system which, as in the first embodiment, is switchable between a four wheel drive mode and a two wheel drive mode, and comprises front wheels 1, rear wheels 2, an engine 3, a hydraulic pump 4, first oil lines 5, a differential 6, a first hydraulic motor 7, second oil lines 8, second hydraulic motors 9, and a shutoff valve 10. This propelling system also comprises a pumping preventive device A for preventing the first hydraulic motor 7 from pumping pressure oil as a result of torque transmission from the front wheels 1 to the first hydraulic motor 7 when the vehicle is driven in the two wheel drive mode.

Figure 5:
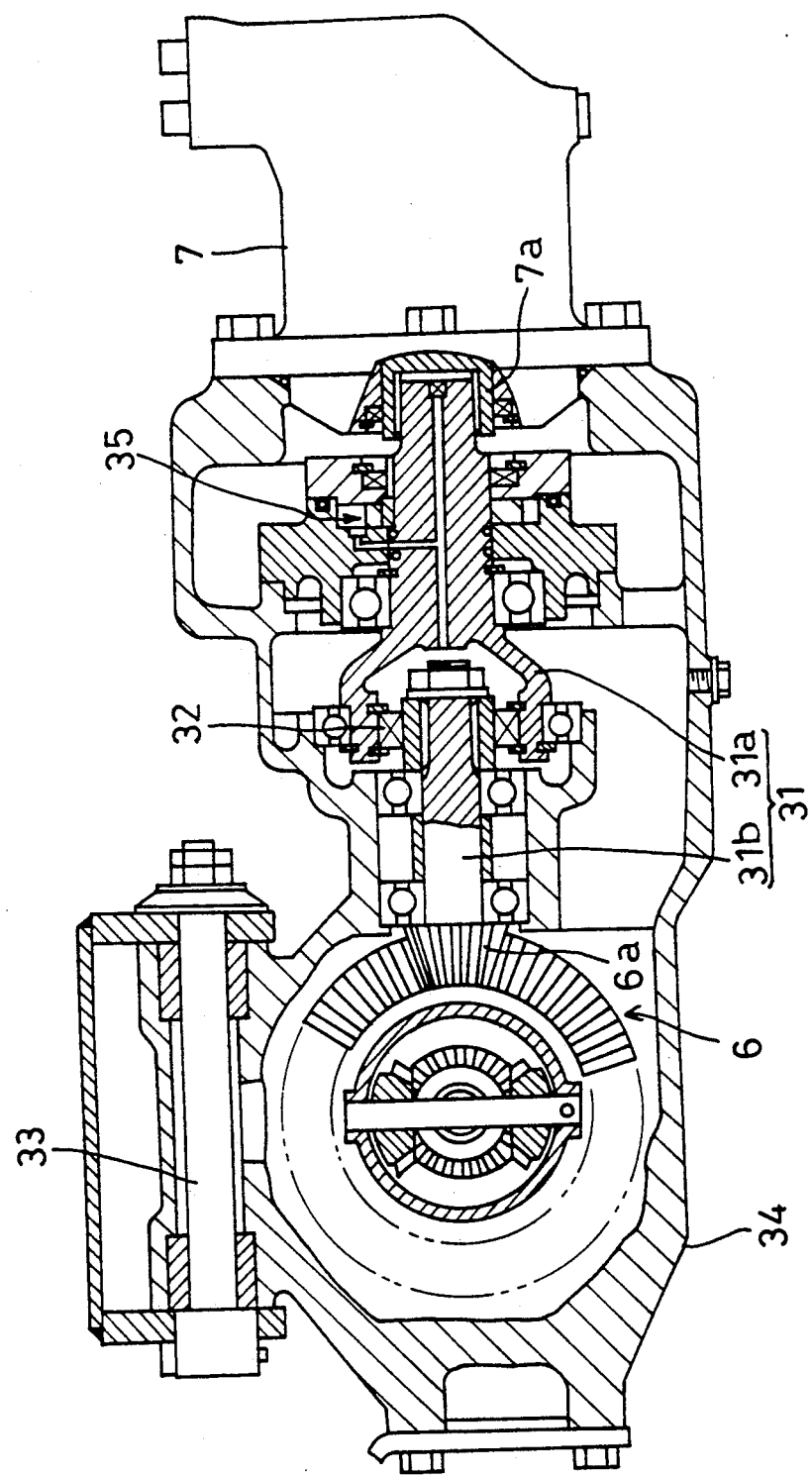
FIG. 5 is a sectional view of a front wheel drive transmission case.

As shown in FIGS. 4 and 5, the pumping preventive device A is provided on a transmission shaft 31 extending between the differential 6 and first hydraulic motor 7. The pumping preventive device A includes a one-way clutch 32 which idles when the vehicle is driven forward. When the vehicle is driven in the two wheel drive mode, torque transmission to the first hydraulic motor 7 is broken by the idling of the one-way clutch 32.

As shown in FIG. 5, the transmission shaft 31 from the first hydraulic motor 7 to the differential 6 is housed in a transmission case 34 supported for free rolling through a rod 33 by vehicle frame not shown. The transmission shaft 31 includes a first shaft 31a splined to an output shaft 7a of the first hydraulic motor 7, and a trochoidal lubricating pump 35 associated with the first shaft 31a. The one-way clutch 32 is disposed between the first shaft 31a and a second shaft 31b having a differential pinion gear 6a.

It will be understood that the first shaft 31a and second shaft 31b constitute the transmission shaft 31.

Apart from the foregoing embodiments, the present invention is applicable to a propelling system which, in the two wheel drive mode, drives only the front wheels. The pumping preventive device may comprise an electromagnetic clutch disposed between a hydraulic motor and the ground wheels associated therewith, the clutch being disengaged for the two wheel drive mode.

Though not illustrated in the drawings, where the vehicle is capable of selectively driving the front wheels or rear wheels in the two wheel drive mode, naturally the pumping preventive device is provided for the second hydraulic motors as well as the first hydraulic motor. That is, hydraulic circuits corresponding to the circuit acting as the pumping preventive device for supplying pressure oil to the drain port 17 of the first hydraulic motor 7 shown in FIG. 1 are added to the second hydraulic motors comprising the radial piston type, with a further shutoff valve provided on the oil lines extending to the second hydraulic motors.

The propelling system according to the present invention is applicable to various four wheel drive vehicles including tractors and lawn mowers.

What is claimed is:

1. A propelling apparatus for a vehicle drivable by four wheels, comprising:
   a first hydraulic motor for driving a first wheel means, said first hydraulic motor being a rotary cylinder radial piston hydraulic motor including an eccentric thrust ring having an inside wall and further including radial pistons operable by an external hydraulic control to move out of contact with the inside wall of the eccentric thrust ring, thereby becoming inoperative,
   a second hydraulic motor for driving a second wheel means,
   a hydraulic pump for supplying oil to said first and second hydraulic motors,
   a first oil line for interconnecting said first hydraulic motor and said hydraulic pump,
   a second oil line for interconnecting said second hydraulic motor and said hydraulic pump,
   a shutoff valve provided on said first oil line, and
   pumping preventive means for preventing said first hydraulic motor from effecting a pumping action due to power transmitted from said first wheel means when said shutoff valve is operated, said pumping preventive means comprising hydraulic circuit means for continuously supplying pressure oil to and rendering inoperative said first hydraulic motor when said shutoff valve is operated.

2. A propelling apparatus as claimed in claim 1, wherein said first wheel means comprises a pair of front wheels, and said second wheel means comprises a pair of rear wheels.

3. A propelling apparatus as claimed in claim 1, wherein said first wheel means comprises a pair of rear wheels, and said second wheel means comprises a pair of front wheels.

4. A propelling apparatus as claimed in claim 1, in which said hydraulic circuit means includes means for conducting pressure oil pumped by said hydraulic pump to said first hydraulic motor for said rendering inoperative of said first hydraulic motor.

5. A propelling apparatus for a vehicle drivable by four wheels, comprising:
   a first hydraulic motor for driving a first wheel means,
   a second hydraulic motor for driving a second wheel means,
   said first and second hydraulic motors each being a rotary cylinder radial piston hydraulic motor including an eccentric thrust ring having an inside wall and further including radial pistons operable by an external hydraulic control to move out of contact with the inside wall of the eccentric thrust ring, thereby becoming inoperative,
   a hydraulic pump for supplying oil to said first and second hydraulic motors,
   a first oil line for interconnecting said first hydraulic motor and said hydraulic pump,
   a second oil line for interconnecting said second hydraulic motor and said hydraulic pump,
   a first shutoff valve provided on said first oil line,
   a second shutoff valve provided on said second oil line,
   pumping preventive means for preventing said first hydraulic motor from effecting a pumping action due to power transmitted from said first wheel means when said first shutoff valve is operated, and for preventing said second hydraulic motor from effecting a pumping action due to power transmitted from said second wheel means when said second shutoff valve is operated, and for preventing said second hydraulic motor from effecting a pumping action due to power transmitted from said second wheel means when said second shutoff valve is operated, said pumping preventive means comprising hydraulic circuit means for continuously supplying pressure oil to and rendering inoperative said first hydraulic motor when said first shutoff valve is operated and continuously supplying oil to and rendering inoperative said second hydraulic motor when said second shutoff valve is operated.

6. A propelling apparatus as claimed in claim 5, in which said hydraulic circuit means includes means for conducting pressure oil pumped by said hydraulic pump to said first hydraulic motor for said rendering inoperative of said first hydraulic motor.

7. A propelling apparatus for a vehicle drivable by four wheels, comprising:
   a first hydraulic motor for driving a first wheel means,
   a second hydraulic motor for driving a second wheel means,
   a hydraulic pump for supplying oil to said first and second hydraulic motors,
   a first oil line for interconnecting said first hydraulic motor and said hydraulic pump,
   a second oil line for interconnecting said second hydraulic motor and said hydraulic pump,
   a shutoff valve provided on said first oil line, and
   pumping preventive means for preventing said first hydraulic motor from effecting a pumping action due to power transmitted from said first wheel means when said shutoff valve is operated, said pumping preventive means comprising hydraulic circuit means for continuously supplying pressure oil to and thereby rendering inoperative said first hydraulic motor when said shutoff valve is operated, said hydraulic circuit means including means for conducting pressure oil pumped by said hydraulic pump to said first hydraulic motor for said rendering inoperative of said first hydraulic motor.

8. A propelling apparatus for a vehicle drivable by four wheels, comprising:
   a first hydraulic motor for driving a first wheel means,
   a second hydraulic motor for driving a second wheel means,
   a hydraulic pump for supplying oil to said first and second hydraulic motors,
   a first oil line for interconnecting said first hydraulic motor and said hydraulic pump,
   a second oil line for interconnecting said second hydraulic motor and said hydraulic pump,
   a first shutoff valve provided on said first oil line,
   a second shutoff valve provided on said second oil line,
   pumping preventive means for preventing said first hydraulic motor from effecting a pumping action due to power transmitted from said first wheel means when said first shutoff valve is operated, and for preventing said second hydraulic motor from effecting a pumping action due to power transmitted from said second wheel means when said second shutoff valve is operated, said pumping preventive means comprising hydraulic circuit means for continuously supplying pressure oil to and thereby rendering inoperative said first hydraulic motor when said first shutoff valve is operated and continuously supplying pressure oil to and thereby rendering inoperative said second hydraulic motor when said second shutoff valve is operated, said hydraulic circuit means including means for conducting pressure oil pumped by said hydraulic pump to said first hydraulic motor for said rendering operative of said first hydraulic motor and to said second hydraulic motor for said rendering inoperative of said second hydraulic motor.

* * * * *